US012677755B2

(12) United States Patent
Acosta et al.

(10) Patent No.: US 12,677,755 B2
(45) Date of Patent: Jul. 14, 2026

(54) SYSTEM AND METHOD FOR FORMING TREES INTO PREDETERMINED LETTER AND WORD CONFIGURATIONS

(71) Applicants: Eduardo Acosta, Miami, FL (US); Skylar Rose Acosta, Miami, FL (US); Zac Edward Acosta, Miami, FL (US)

(72) Inventors: Eduardo Acosta, Miami, FL (US); Skylar Rose Acosta, Miami, FL (US); Zac Edward Acosta, Miami, FL (US)

( * ) Notice: Subject to any disclaimer, the term of this patent is extended or adjusted under 35 U.S.C. 154(b) by 0 days.

(21) Appl. No.: 18/742,293

(22) Filed: Jun. 13, 2024

(65) Prior Publication Data

US 2025/0380645 A1      Dec. 18, 2025

(51) Int. Cl.
| | |
|---|---|
| *A01G 5/04* | (2006.01) |
| *A01G 5/02* | (2006.01) |
| *A01G 17/08* | (2006.01) |
| *A01G 17/14* | (2006.01) |

(52) U.S. Cl.
CPC ................. *A01G 5/04* (2013.01); *A01G 5/02* (2013.01); *A01G 17/08* (2013.01); *A01G 17/14* (2013.01)

(58) Field of Classification Search
CPC .......... A01G 17/08; A01G 17/04; A01G 5/02; A01G 5/04
See application file for complete search history.

(56) References Cited

U.S. PATENT DOCUMENTS

| | | | | |
|---|---|---|---|---|
| 516,259 | A | * | 3/1894 | Brueckner ............... A01G 5/04 428/10 |
| 1,300,775 | A | * | 4/1919 | Reed .................... B65D 85/505 47/41.01 |
| RE15,635 | E | * | 6/1923 | Williams ................. A01G 5/04 428/27 |
| 1,994,694 | A | * | 3/1935 | Dobron .................... A01G 5/04 211/195 |
| 2,258,442 | A | * | 10/1941 | Brenner ................... A01G 5/04 428/10 |
| 2,650,454 | A | * | 9/1953 | Wurdinger ............. A01G 17/08 248/87 |
| 2,716,827 | A | * | 9/1955 | Mixter ..................... A01G 5/04 47/41.12 |
| 2,717,750 | A | * | 9/1955 | White ..................... A47F 5/108 248/27.8 |
| 2,725,205 | A | * | 11/1955 | Wagler .................... A01G 5/04 47/41.01 |

(Continued)

*Primary Examiner* — Jessica B Wong
(74) *Attorney, Agent, or Firm* — Albert Bordas, Esq.

(57) ABSTRACT

A system for forming trunks of trees, plants, and vines into predetermined letter, word, numerical, and shape configurations having a wire assembly with a guide wire having a predetermined configuration; and a trunk of a predetermined thickness, whereby the trunk is secured to the guide wire, wherein the trunk adopts the configuration of the guide wire as it grows, thickens, and matures. The guide wire is a single continuous wire and is of a predetermined gauge to be shaped into said predetermined configuration. The configuration is a letter, letters, a word, words, a number, numbers, and/or a geometric shape, shapes. The trunk is secured to said guide wire with zip ties that are positioned separated a predetermined distance from each other allowing the trunk to align with the guide wire to adopt to the predetermined configuration.

7 Claims, 4 Drawing Sheets

(56)  References Cited

U.S. PATENT DOCUMENTS

| | | | | | |
|---|---|---|---|---|---|
| 2,740,218 | A | * | 4/1956 | Miller | A01G 5/02 428/17 |
| 2,849,822 | A | * | 9/1958 | Bachman | A01G 5/04 428/10 |
| 2,850,826 | A | * | 9/1958 | Testa | A01G 5/04 47/41.12 |
| 3,050,890 | A | * | 8/1962 | Bloch | A01G 5/04 428/10 |
| 3,131,732 | A | * | 5/1964 | Thurston | A01G 17/085 140/149 |
| 3,878,590 | A | * | 4/1975 | Bolger | A01G 17/08 248/317 |
| 5,235,780 | A | * | 8/1993 | Colbert | A01G 5/04 47/79 |
| 5,299,382 | A | * | 4/1994 | Carmichael | A01G 5/04 428/10 |
| 5,444,939 | A | | 8/1995 | Cullen | |
| 5,501,035 | A | * | 3/1996 | Downer | A01G 17/06 256/57 |
| D387,633 | S | * | 12/1997 | Whalen | D11/164 |
| 6,000,171 | A | | 12/1999 | Wotton | |
| 6,565,047 | B1 | * | 5/2003 | Cheung | A01G 5/04 248/346.03 |
| 7,941,967 | B2 | * | 5/2011 | Jolley | A01G 17/04 47/66.7 |
| 8,151,516 | B1 | * | 4/2012 | Harshman | A01G 5/04 47/41.01 |
| 8,322,071 | B1 | | 12/2012 | Spero | |
| 8,973,593 | B1 | | 3/2015 | Rudy | |
| 9,357,713 | B1 | * | 6/2016 | Sharpe | A01G 5/04 |
| 11,684,023 | B2 | | 6/2023 | Jablonski | |
| 2007/0113470 | A1 | * | 5/2007 | Mucci | A01G 17/08 47/44 |
| 2007/0231095 | A1 | | 10/2007 | Barbir | |
| 2009/0302184 | A1 | * | 12/2009 | Boschetto | A01G 5/04 248/311.2 |
| 2010/0095585 | A1 | * | 4/2010 | Hall | A47G 7/02 47/41.11 |
| 2010/0115838 | A1 | * | 5/2010 | Jolley | A01G 17/04 47/66.7 |
| 2010/0319247 | A1 | * | 12/2010 | Anderson | A01G 5/04 47/41.1 |
| 2013/0008083 | A1 | * | 1/2013 | Weder | B21C 37/155 47/45 |
| 2015/0143747 | A1 | * | 5/2015 | Mowla | A01G 5/06 47/65.5 |
| 2018/0177139 | A1 | | 6/2018 | Torres Carpio | |
| 2018/0220590 | A1 | | 8/2018 | Curtis | |
| 2019/0150374 | A1 | * | 5/2019 | Long | A01G 17/08 |
| 2020/0383274 | A1 | * | 12/2020 | Thomasson | A47F 7/0078 |
| 2024/0251718 | A1 | * | 8/2024 | Sparzak | A01G 5/04 |

* cited by examiner

SYSTEM AND METHOD FOR FORMING TREES INTO PREDETERMINED LETTER AND WORD CONFIGURATIONS

BACKGROUND OF THE INVENTION

The present invention relates to tree, plant, and vine trunk designs, and more particularly, to a system and method for forming trunks of trees, plants, and vines into predetermined letter, word, numerical, and shape configurations.

PRIOR ART

Applicant believes that one of the closest references corresponds to U.S. Pat. No. 8,973,593 B1 issued to Rudy; Christopher John on 2015 Mar. 10 for Vegetation-containing Hunting Blind. However, it differs from the present invention because Rudy teaches a vegetation-containing hunting blind including a vegetation-shielding/offering member. Inside the member vegetation can be grown.

Applicant believes that another reference corresponds to U.S. Pat. No. 8,322,071 B1 issued to Spero; Susan E. on 2012 Dec. 4 for Plant Securing Apparatus. However, it differs from the present invention because Spero teaches a plant securing apparatus, which provide an elongated portion having multiple plant-securing loops attached to the elongated portion. The elongated portion is comprised of a flexible material, such as woven nylon. During use, the elongated portion is attached to a stake or post, and the plant-securing loops support a plant, such as a tomato vine. Another embodiment uses wire fasteners to secure the plant to the stake.

Applicant believes that another reference corresponds to U.S. Pat. No. 5,444,939 A issued to Cullen; Brian on 1995 Aug. 29 for Plant Tie for Indoor Plants. However, it differs from the present invention because Cullen teaches a plant tie including an elongate strip of flaccid or cloth material having flexible cloth fastener elements on the opposed ends thereof for selective engagement with each other to secure the strip about a plant stem. A mounting element is positioned centrally of the strip and includes an enlarged pressure-receiving head engaged with one face of the strip and an elongate pin shaft engaged through the strip and projecting beyond the other face thereof for manually driving into engagement with a wall.

Applicant believes that another reference corresponds to U.S. Pat. No. 6,000,171 A issued to Wotton; Michael C. on 1999 Dec. 14 for Method of Holding a Plant to a Stake and a Kit therefore. However, it differs from the present invention because Wotton teaches a method of holding plants to a stake. A posable figure preferably having a plurality of elongate positionable appendages is provided. The posable figure preferably has an internal bendable wire frame and external relatively soft body, appendage, and head portions surrounding the wire frame. In addition, the figure is preferably a whimsical figure, such as a fanciful frog, garden bug, or farmer. A stake is inserted into the soil or other ground or potting material adjacent the plant. Then a pair of appendages of the figure are positioned on either side of the plant stem and stake and bent about the plant stem and the stake. The process is preferably repeated for additional appendages. The method provides a quick, easy, and decorative manner for safely holding a plant to a stake. A kit of posable figures is also provided for practicing the method. In addition, a method is provided for using bendable plant ties having a non-figure-like form to safely and securely tie a plant to a stake, and a kit of such bendable plant ties is also provided.

Applicant believes that another reference corresponds to U.S. Pat. No. 11,684,023 B2 issued to Jablonski; Mark A. on 2023 Jun. 27 for Plant Support Apparatus. However, it differs from the present invention because Jablonski teaches a support apparatus having: (a) pole, aligned in an approximately vertical orientation when in use, and a cross section, wherein the pole comprises one or more pairs of diametrically opposed holes, positioned along the length of the pole; (b) a unitary open hoop, approximately in a plane, comprising an elastic material; and further comprising: a first end portion an a second end portion; wherein when in use, the hoop is compressed so that the first end portion and the second end portion are urged past each other to form a parallel locus; and wherein when the hoop is compressed, the first end portion and the second end portion are formed as if bent to mate with and apply an opposed tension to a pair of diametrically opposed holes in the pole; and wherein when the hoop is compressed, the parallel locus engages with the pole to impede the vertical swing of the hoop.

Applicant believes that another reference corresponds to U.S. Patent Application Publication No. 20180220590 A1, published on 2018 Aug. 9 to Shaffer; Curtis L. for Floral and Plant Bouquet Arranging Fixture. However, it differs from the present invention because Shaffer teaches a reusable floral bouquet arranging fixture having a 3D substantially conic section frame, with apertures arranged thereon for the insertion of plant stems, such that the plant stems converge substantially to a common point; wherein the frame attaches to an adjustable support apparatus, including an associated spindle, and a bracket having a lower arm with a slotted portion that adjusts the location of the spindle, and an upper arm slotted portion that adjusts the location of a holding device, including a clamp that attaches to a base; and wherein said frame is removable for use at an event, as a gift, or as a household or business decoration.

Applicant believes that another reference corresponds to U.S. Patent Application Publication No. 20070231095 A1, published on 2007 Oct. 4 to Barbir; Wesley Val for Plant and Stem Design and Method of Making. However, it differs from the present invention because Barbir teaches a lifelike carving product and method of producing the same. The product may be utilized as an only or integral part of architectural elements to show designs of plant, fruit, and/or vegetable. The product includes at least one plant body, at least one stem, and a realistic fruit-stem/vegetable-stem interface. The plant body may include a flattened area, a stem receptacle whereat a plant end of the stem converges to the plant body, and an arcuate rim that at least partially surrounds the plant end in the stem receptacle. The realistic fruit-stem/vegetable-stem interface may be formed with the stem converging to the plant body perpendicularly with respect to a tangent line, or with a stem centerline of the stem aligning with a stem plane.

Applicant believes that another reference corresponds to U.S. Patent Application Publication No. 20180177139 A1 published on 2018 Jun. 28 to Torres Carpio; Josep for Plant support collar. However, it differs from the present invention because Torres teaches a plant support collar for supporting plant stems that include a central frame. The collar further includes a first hook member and a second hook member extending from the central frame in different directions. The first hook member and the second hook member each have a free end, the free end together with the central frame defining a passage for accommodating plant stems in the respective hook member. The central frame includes a support area configured to abut an intersection of the stems.

Applicant believes that another reference corresponds to U.S. Patent Application Publication No. 20180084739 A1, published on 2018 Mar. 29 to Bottari; Francesco for Enclosing vegetative sheath. However, it differs from the present invention because Bottari teaches an enclosing plant sheath for encircling and protecting a plant stem or vine, which may be joined with other similar sheaths, to create a beneficial microenvironment for developing plants.

Other patents describing the closest subject matter provide for a number of more or less complicated features that fail to solve the problem in an efficient and economical way. None of these patents suggest the novel features of the present invention.

SUMMARY OF THE INVENTION

The present invention is a system for forming trunks of trees, plants, and vines into predetermined letter, word, numerical, and shape configurations, comprising a wire assembly comprising a guide wire having a predetermined configuration, and a trunk of a predetermined thickness, whereby the trunk is secured to the guide wire, wherein the trunk adopts the configuration of the guide wire as it grows, thickens, and matures.

In a preferred embodiment, the guide wire is a single continuous wire and is of a predetermined gauge to be shaped into the predetermined configuration. The configuration is a letter, letters, a word, words, a number, numbers, and/or a geometric shape, shapes. The trunk is secured to the guide wire with zip ties. The zip ties are positioned separated a predetermined distance from each other allowing the trunk to align with the guide wire to adopt to the predetermined configuration. The trunk is of a first diameter that is lesser than a second diameter of the guide wire. In another embodiment, the trunk is of a third diameter that is approximately the same as a fourth diameter of the guide wire. The trunk is of a live tree, plant, or vine. The system further comprises a support stick or rod to support the guide wire. The configuration is in any orientation.

A method for forming trunks of trees, plants, and vines into predetermined letter, word, numerical, and shape configurations comprises the steps of:

A) shaping a guide wire into a predetermined configuration;

B) positioning zip ties separated at predetermined distances from each other allowing the trunk of the tree, plant, or vine to align with the guide wire;

C) securing the trunk of the tree, plant, or vine to the guide wire with the zip ties; and D) allowing the trunk of the tree, plant, or vine to grow while adopting the configuration of the guide wire.

It is therefore one of the main objects of the present invention to provide a system and method for forming trunks of trees, plants, and vines into predetermined letter, word, numerical, and shape configurations.

It is another object of this invention to provide a system and method for forming trunks of trees, plants, and vines into predetermined letter, word, numerical, and shape configurations in which a plant trunk is adapted to form a predetermined design.

It is another object of this invention to provide a system and method for forming trunks of trees, plants, and vines into predetermined letter, word, numerical, and shape configurations in which the trees are live.

Further objects of the invention will be brought out in the following part of the specification, wherein detailed description is for the purpose of fully disclosing the invention without placing limitations thereon.

BRIEF DESCRIPTION OF DRAWINGS

With the above and other related objects in view, the invention consists in the details of construction and combination of parts as will be more fully understood from the following description, when read in conjunction with the accompanying drawings in which.

DETAILED DESCRIPTION OF THE INVENTION

Figure 1:
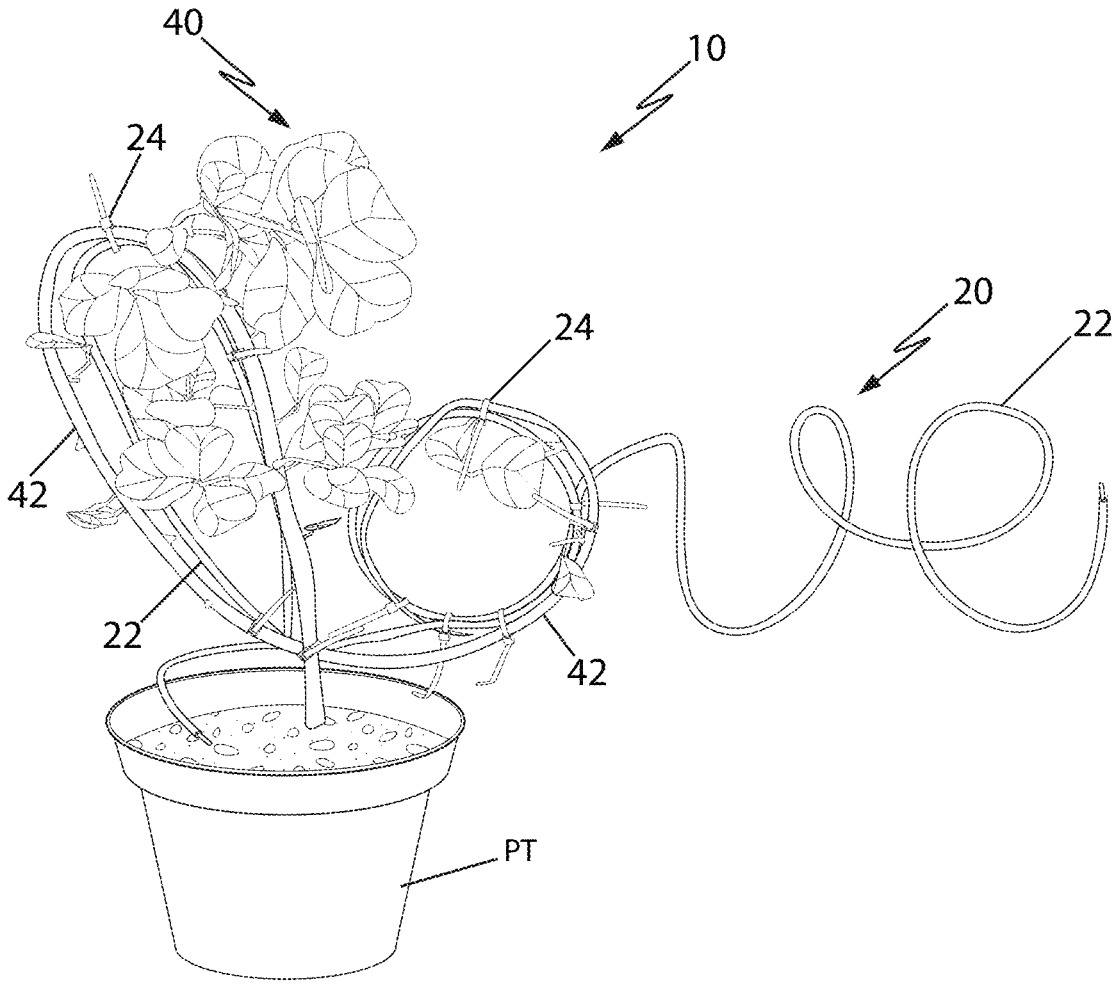
FIG. 1 represents an isometric view of the present invention showing a trunk of a tree, plant, or vine growing in a configuration of the word "love", and in a horizontal orientation.

Referring now to the drawings, the present invention is a system and method for forming trunks of trees, plants, and vines into predetermined letter, word, numerical, and shape configurations and is generally referred to with numeral 10. It can be observed that it basically includes wire assembly 20.

Figure 2:
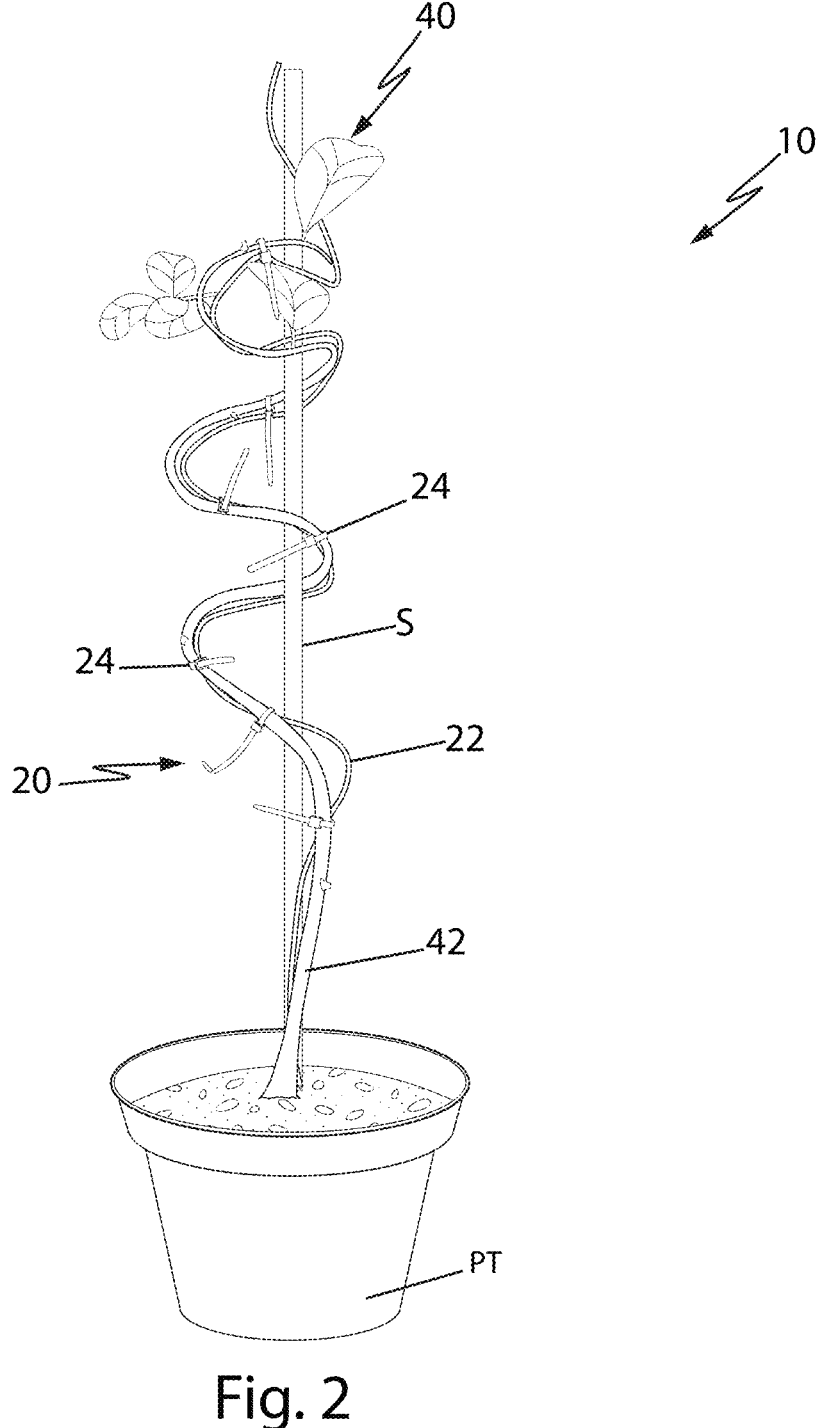
FIG. 2 is an isometric view of the present invention showing a trunk of a tree, plant, or vine secured onto a guide wire around a support stick.

As seen in FIGS. 1 and 2, wire assembly 20 comprises guide wire 22. Wire assembly 20 further comprises zip ties 24 as a means to secure trunk 42 of tree, plant, or vine 40 to guide wire 22 having a predetermined letter, word, numerical, and/or shape configuration.

Guide wire 22 is formed into a predetermined configuration. Such a configuration can be, as an example, any predetermined letter, word, numerical, and/or shape configuration. Such a configuration can also be, as another example, a letter, letters, a word, words, a number, numbers, a geometric shape, shapes. In a preferred embodiment, guide wire 22 is a single continuous wire.

It is noted that trunk 42 of tree, plant, or vine 40 has a predetermined thickness to allow trunk 42 to bend without snapping or breaking, to align and adopt to take on the predetermined configuration defined by guide wire 22.

Once guide wire 22 is formed into the predetermined configuration, trunk 42 is secured onto guide wire 22. In a preferred embodiment, zip ties 24 are used at predetermined distances from each other to fix trunk 42 onto guide wire 22. Other means to secure trunk 42 of tree, plant, or vine 40 onto guide wire 22 instead of zip ties 24, can be but are not limited to: string, wire, rope, and/or other fasteners. As trunk 42 of tree, plant, or vine 40 grows/thickens/matures, it will permanently take on the predetermined configuration/shape defined by guide wire 22.

In one embodiment, guide wire 22 is a coated wire and comprises a predetermined gauge to be shaped into the predetermined configuration. As mentioned above, such a configuration can be, as an example, any predetermined letter, word, numerical, and/or shape configuration. Such a configuration can also be, as another example, a letter, letters, a word, words, a number, numbers, a geometric shape, shapes, and/or a plurality of any letter/letters, word/ words, number/numbers, geometric shape/shapes. In a preferred embodiment, when initially securing trunk 42 of tree, plant, or vine 40 onto guide wire 22, a first diameter of trunk 42 is lesser than a second diameter of guide wire 22. In another embodiment, when initially securing trunk 42 of tree, plant, or vine 40 onto guide wire 22, said trunk is of a third diameter that is approximately the same as a fourth diameter of guide wire 22. It is noted that guide wire 22 may also be a rod, or any other elongated object, that is formed or can be shaped into the predetermined configuration and can be of any materials including, but not limited to, metals and plastics.

Figure 3:
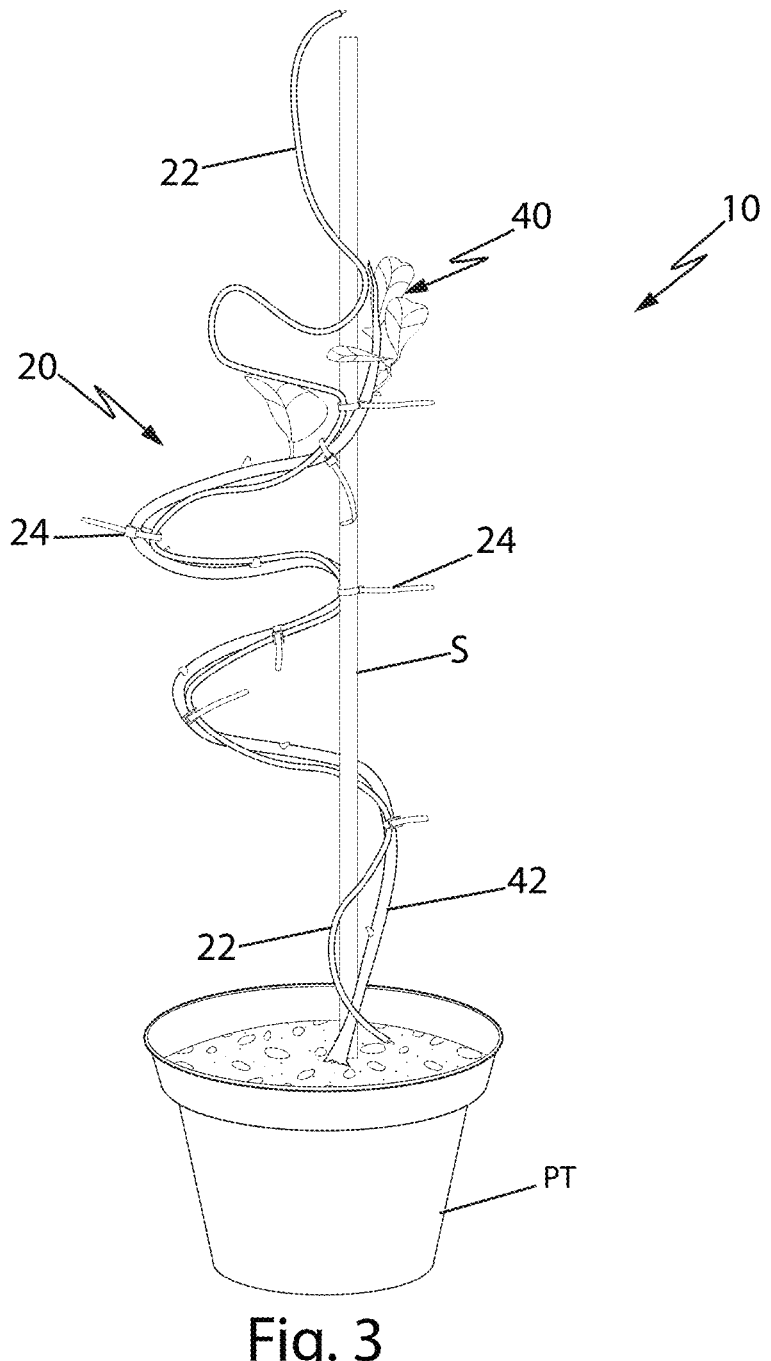
FIG. 3 is an isometric view of the present invention showing a trunk of a tree, plant, or vine growing in a configuration secured onto a guide wire around a support stick.
Figure 4:
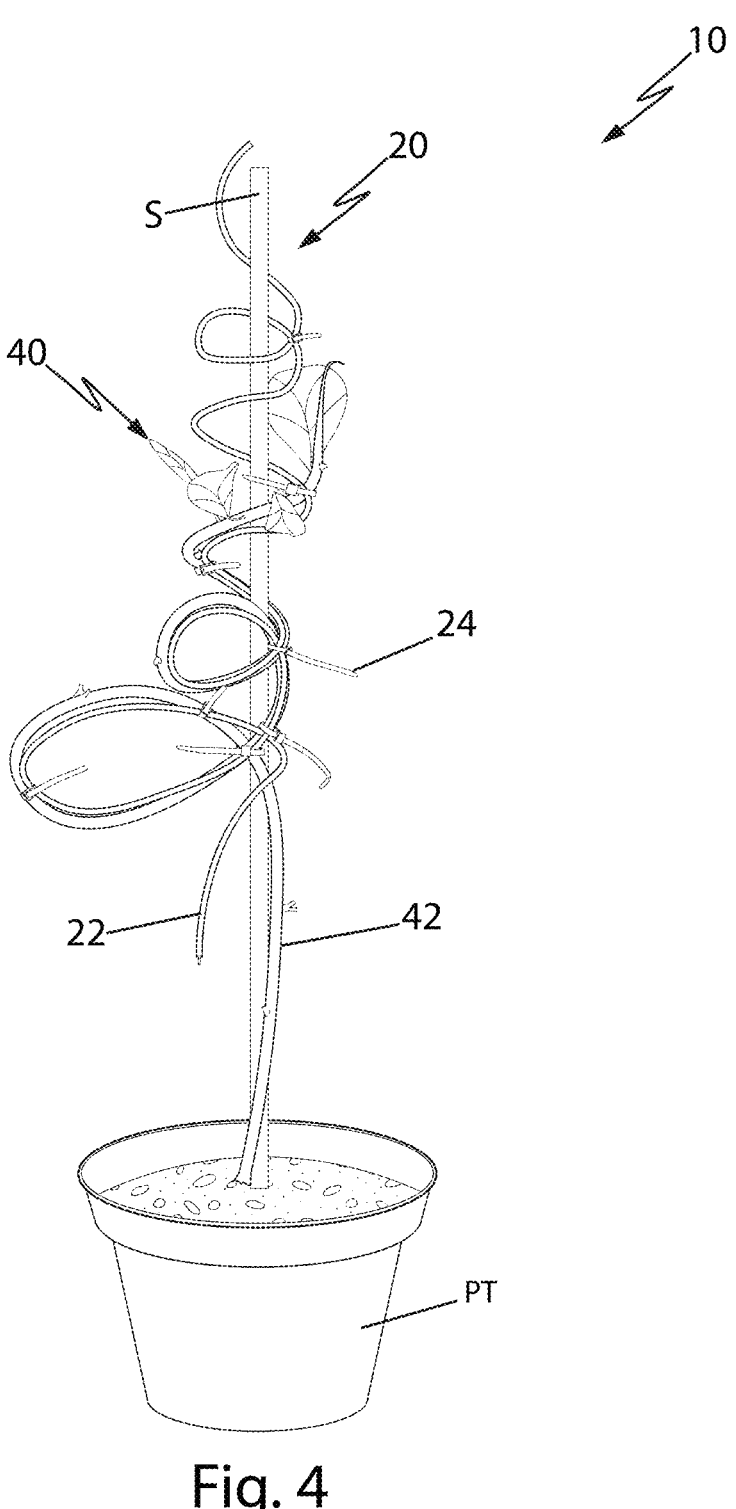
FIG. 4 is an isometric view of the present invention showing a trunk of a tree, plant, or vine growing in a configuration of the word "love", secured onto a guide wire around a support stick, and in a vertical orientation.

As seen in FIGS. 3 and 4, tree, plant, or vine 40 is live. In one embodiment, tree, plant, or vine 40 is planted in pot PT. It is noted however that tree, plant, or vine 40 can be planted into any shaped planting container or in the ground as in a garden or section of land. In a larger commercial scale, tree, plant, or vine 40 is planted in land such as in a nursery, field, or farm.

Optionally, present invention 10 may further comprise support stick or rod S to support guide wire 22 with trunk 42.

Present invention 10 can be placed into a horizontal orientation as seen in FIG. 1, or a vertical orientation as seen in FIG. 4. Although not illustrated, it is understood that present invention 10 can be placed into any desired orientation.

In a preferred embodiment, a method for forming trunks of trees, plants, and vines into predetermined letter, word, numerical, and shape configurations comprises the steps of:

A) shaping guide wire 22 into a predetermined configuration;

B) positioning zip ties 24 separated at predetermined distances from each other allowing trunk 42 of tree, plant, or vine 40 to align with guide wire 22;

C) securing trunk 42 of tree, plant, or vine 40 to guide wire 22 with zip ties 24; and D) allowing trunk 42 of tree, plant, or vine 40 to grow while adopting the configuration of guide wire 22.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for forming trunks of trees, plants, and vines into predetermined letter, word, numerical, and shape configurations, consisting of:

A) a single continuous guide wire having a predetermined gauge shaped into said predetermined configuration(s);

B) a continuous trunk of a predetermined thickness, whereby said continuous trunk is secured to said guide wire, wherein said continuous trunk adopts said configuration of said guide wire as it grows, thickens, and matures, wherein said continuous trunk is of a live tree, plant, or vine planted in a pot and protruding therefrom, wherein said configuration is a single continuous letter, letters, word, words, number, numbers, and/or geometric shape, shapes, said continuous trunk is secured to said guide wire with at least one zip tie allowing said continuous trunk to align with said guide wire to adopt to said predetermined configuration, wherein said continuous trunk is of a first diameter that is approximately the same as a second diameter of said single continuous guide wire; and C) a support stick or rod to support said guide wire, said support stick or rod also protrudes from said pot and is positioned adjacent to said continuous trunk.

2. The system for forming trunks of trees, plants, and vines into predetermined letter, word, numerical, and shape configurations set forth in claim 1, wherein said configuration is a horizontal orientation.

3. The system for forming trunks of trees, plants, and vines into predetermined letter, word, numerical, and shape configurations set forth in claim 1, wherein said configuration is a vertical orientation.

4. A method for forming trunks of trees, plants, and vines into predetermined letter, word, numerical, and shape configurations consisting of the steps:

A) shaping a single continuous guide wire having a predetermined gauge into said predetermined configuration(s);

B) positioning a zip tie onto a continuous trunk of a predetermined thickness of a tree, plant, or vine planted in a pot and protruding therefrom, to align with said guide wire to adopt to said predetermined configuration, wherein said continuous trunk is of a first diameter that is approximately the same as a second diameter of said single continuous guide wire;

C) securing said continuous trunk of said tree, plant, or vine to said guide wire with said zip tie;

D) allowing said continuous trunk of said tree, plant, or vine to grow, thicken, and mature while adopting said predetermined configuration of said single continuous guide wire, wherein said predetermined configuration is a single continuous letter, letters, word, words, number, numbers, and/or geometric shape, shapes; and E) supporting said guide wire with a support stick or rod, wherein said support stick or rod also protrudes from said pot and is positioned adjacent to said single continuous trunk.

5. The method for forming trunks of trees, plants, and vines into predetermined letter, word, numerical, and shape configurations set forth in claim 4, wherein said continuous trunk is of a live tree, plant, or vine.

6. The method for forming trunks of trees, plants, and vines into predetermined letter, word, numerical, and shape configurations set forth in claim 5, wherein said configuration is a horizontal orientation.

7. The method for forming trunks of trees, plants, and vines into predetermined letter, word, numerical, and shape configurations set forth in claim 5, wherein said configuration is a vertical orientation.

* * * * *